UNITED STATES PATENT OFFICE.

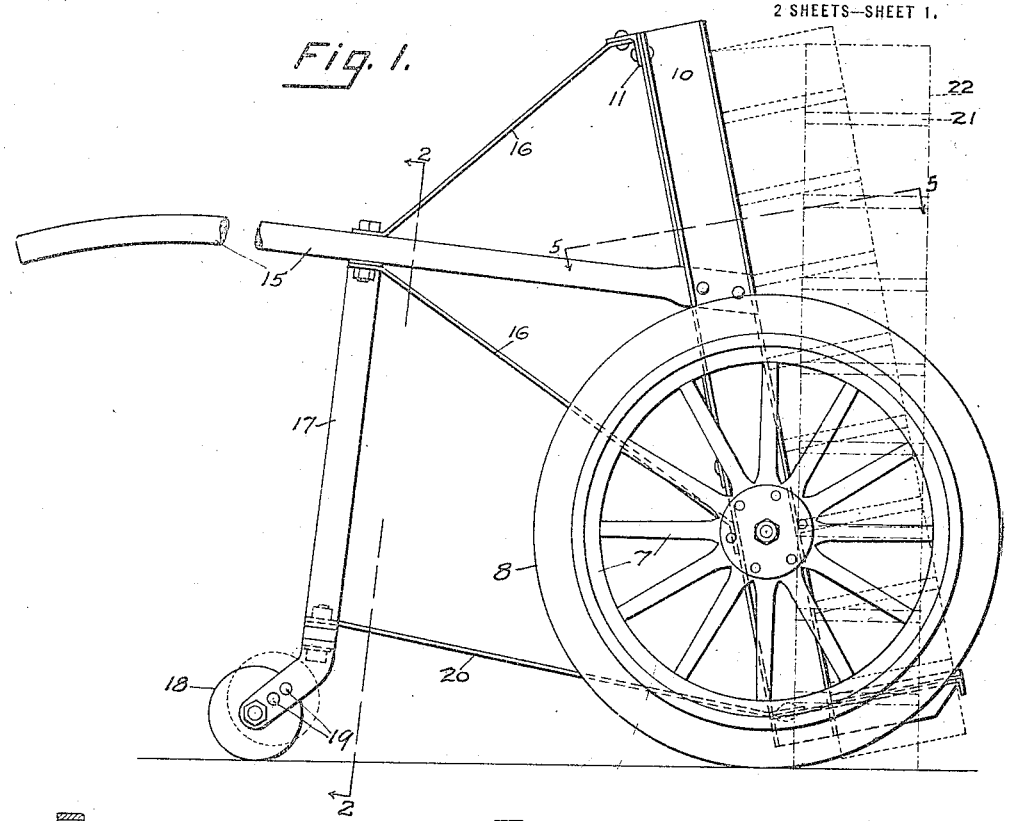
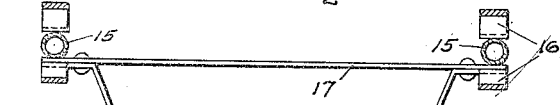
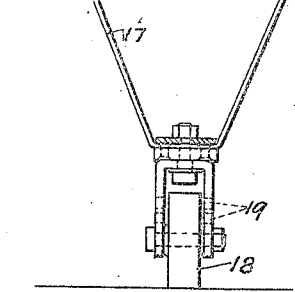

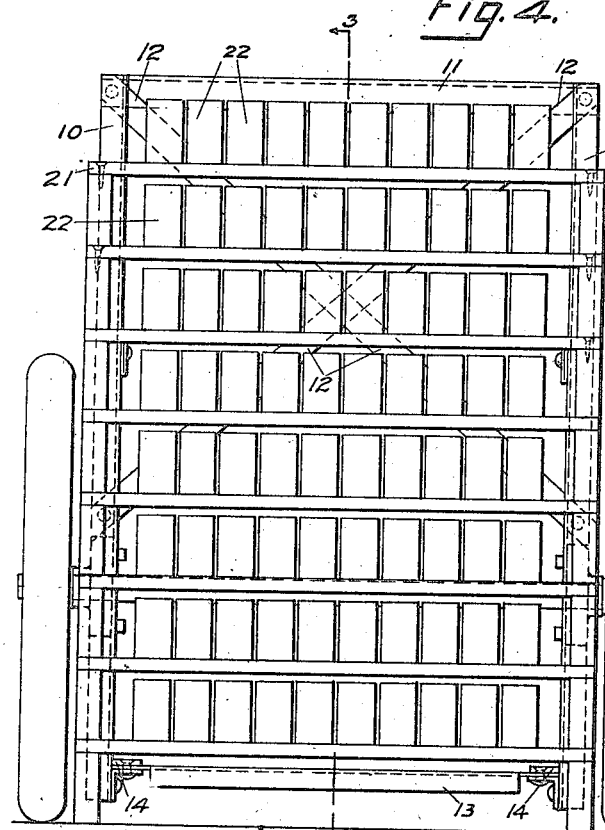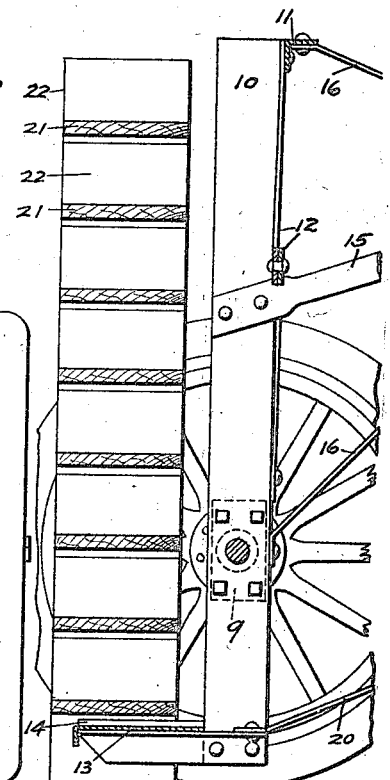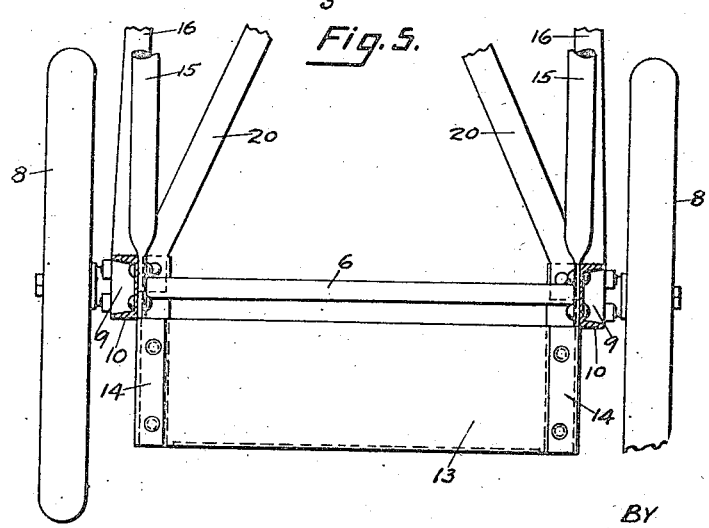

DAVID F. SHOPE, OF PORTLAND, OREGON, ASSIGNOR TO THE SHOPE BRICK COMPANY, A CORPORATION OF OREGON.

BRICK-CARRYING VEHICLE.

1,424,741.

Specification of Letters Patent.   Patented Aug. 1, 1922.

Application filed October 25, 1920. Serial No. 419,280.

*To all whom it may concern:*

Be it known that I, DAVID F. SHOPE, a citizen of the United States, residing at Portland, in the county of Multnomah and State of Oregon, have invented a new and useful Improvement in Brick-Carrying Vehicles, of which the following is a specification, reference being had to the accompanying drawings.

My invention relates to vehicles for transporting pallets bearing articles formed from plastic material, as a class.

The object of my invention is to provide a vehicle of this class particularly adapted to pick up, transport and deposit a series of pallets piled one upon another in a vertical position while said pallets contain formed material of concrete, clay, etc., in a plastic state, and to effect this without disturbance of or injury to said plastic material. These objects, as well as other advantages, I attain by the construction, combination and arrangement of parts illustrated in the accompanying drawings which form a part hereof.

Fig. 1 is a side elevation of the vehicle.

Fig. 2 is a view on the line 2—2 in Fig. 1, partly in section.

Fig. 3 is a view on the line 3—3 in Fig. 4, partly in section.

Fig. 4 is a front elevation of the vehicle with loaded pallets in position thereon.

Fig. 5 is a view of parts of the vehicle on the line 5—5 in Fig. 1.

Like characters refer to like parts in the views.

The vehicle has a two-wheeled truck, wherein is a shaft 6 and wheels 7, provided with pneumatic tires 8. Bearings 9 are mounted on the shaft 6 adjacent to each wheel inwardly from the travelling path of same. The channeled frame bars 10 are rigidly secured upon the bearings 9 at a desired distance from the lower ends of the bars, and the bearings are also positioned between the rear and forward edges of the bars 10, or substantially in alignment with either edge in order to bring the fulcrum provided by these bearings for the frame in a desired place, preferably in alignment with the forward edge. The frame bars 10 are secured to each other by a transverse bar 11 joining their upper ends and transversely connecting bars 12. The lower ends of the bars 10 are secured to each other by a transverse plate 13. The plate 13 has transverse strips 14 near each end rigidly secured upon its upper surface adjacent to the frame members 10. Handles 15 are rigidly secured at one end of the opposing frame members 10 at a desired height and extend rearwardly at a desired angle therefrom. Brace rods 16 connect the frame members 10 and the opposing handles. A triangular caster frame 17 is rigidly secured at its upper ends to the opposing handles and between them. Below the lower angle of the frame 17 a caster 18 is pivotally mounted. The caster is provided with means 19 to adjust it at a desired distance below the handles. The caster frame 17 has brace bars 20 with one rigidly secured near the lower end of the caster frame, the opposing end secured to the opposing frame members 10 at the lower end thereof. A stack of brick pallets 21 with bricks 22 thereon is shown in dotted lines in Fig. 1, as deposited vertically on the ground, and as resting upon the vehicle. In Figs. 3 and 4 the vehicle is shown advanced in position to pick up the pallet stack from the ground.

It will now be seen that the pallets, with brick in plastic condition thereon, are previously stacked by the brick-maker vertically on the ground or floor. The handles 15 are raised until the frame members 10 are vertical and the carrying strips 14 are horizontal. The vehicle is then advanced until the strips 14 extend beneath the lowest pallet. The handles are then depressed. This causes the strips 14 to engage the lowest pallet and raise the stack. The strips, then assuming an inclined position, causes the stack to tilt rearwardly until it rests against the frame, supported on the strips. When the pallet stack is transported to a desired place, the handles are raised until the stack tilts to a vertical position and again rests on the floor with the vehicle in its starting position. It may then be withdrawn to repeat the operation. The hard or cured product may be transported in like manner. With my device the entire stack is transported without touching it with the hand. There is a single lift in picking up and a single drop in depositing. Casters or wheels of small diameter, or wheels of any size, without resilient means thereon, will not allow the transportation of plastic material without some injury to the same, even with the exercise of the greatest care in operation. The large wheels, with pneumatic tires, provided in my device, in combination with the other elements herein referred to, make a carrier which has been demonstrated in practical use to be one which overcomes the difficulties heretofore met in other devices employed for a like purpose. It is well known that material of this kind, in plastic condition, requires great care to transport it without damage and loss. Also that such plastic material placed on pallets in a vertical position as contemplated, cannot be tilted out of such position with a jolting or oscillating motion, or beyond certain limits of inclinaton, without causing some of the integral parts of the material to shift in the units, or to break therefrom, and thus bring about a condition of the cured product depreciating its value or rendering it wholly unsaleable. The fulcrum position of the carrier frame in my device is arranged to allow the pallet stack to be picked up and deposited with a minimum tilt from vertical position, hence without appreciable injury to material units. The handles are also an element required to accomplish the same result and this is by reason of the angle at which they are secured to the frames. It is also well known that it is a common practice to carry pallets singly or in pairs by hand for deposit, or to load such upon vehicles and again handle them for deposit in the same way. These methods are cumbersome, not economical of labor, and entail a large percentage of damage. These and other difficulties I have overcome in my device. It has the advantage of simple construction, easy and speedy operation, and is distinctly new and useful. It is intended to arrange the parts to bring the load center of gravity as nearly as possible over the truck shaft. To accomplish this, counterweight may be added upon the handles at a desired place. The adjustable caster affords a means to set the carrying frame at a desired inclination while a load is being carried, and also relieves the operator of guiding the vehicle for this purpose and assuming part of the load in doing so. The caster mechanism is therefore a useful feature of the device. I have shown a form of adjusting the caster, but other suitable means may be substituted without departing from the principle thereof.

I claim—

In a vehicle of the kind described, the combination of, an upright carrying frame pivotally mounted on an axle at a substantial distance from the upper end of the frame, and a two-wheeled truck having the same axle and supporting wheels of a diameter relatively large with respect to the length of said frame and equipped with highly resilient tires.

DAVID F. SHOPE

Witnesses:
HAROLD G. SCOTT.
C. W. ROBERTS.